(12) United States Patent
Donahue (10) Patent No.: US 11,880,060 B2
(45) Date of Patent: Jan. 23, 2024

(54) LARGE FORMAT SOLAR SIGN

(71) Applicant: OptoGlo, Inc., Leominster, MA (US)

(72) Inventor: Kevin Donahue, Harvard, MA (US)

(73) Assignee: OptoGlo, Inc., Leominster, MA (US)

( * ) Notice: Subject to any disclaimer, the term of this patent is extended or adjusted under 35 U.S.C. 154(b) by 0 days.

(21) Appl. No.: 17/696,761

(22) Filed: Mar. 16, 2022

(65) Prior Publication Data

US 2022/0299694 A1 Sep. 22, 2022

Related U.S. Application Data

(60) Provisional application No. 63/162,329, filed on Mar. 17, 2021.

(51) Int. Cl.
| | |
|---|---|
| *F21V 8/00* | (2006.01) |
| *F21S 2/00* | (2016.01) |
| *F21S 9/03* | (2006.01) |
| *F21Y 115/10* | (2016.01) |

(52) U.S. Cl.
CPC ............ *G02B 6/006* (2013.01); *F21S 2/005* (2013.01); *F21S 9/03* (2013.01); *G02B 6/0051* (2013.01); *F21Y 2115/10* (2016.08)

(58) Field of Classification Search
CPC ....... G02B 6/006; G02B 6/0051; F21S 2/005; F21S 9/03
See application file for complete search history.

(56) References Cited

U.S. PATENT DOCUMENTS

| | | | |
|---|---|---|---|
| 3,824,726 A | 7/1974 | Schubert | |
| 5,381,502 A | 1/1995 | Veligdan | |
| 8,227,072 B2 * | 7/2012 | Le Bris | A47J 36/025 220/573.1 |
| 8,254,736 B2 * | 8/2012 | Whang | F24S 23/10 385/36 |
| 9,521,713 B2 * | 12/2016 | Niebert | H05B 47/18 |
| 9,837,852 B1 * | 12/2017 | Barnes | F21V 7/22 |
| 10,203,443 B2 * | 2/2019 | Chang | G02B 6/0036 |

(Continued)

FOREIGN PATENT DOCUMENTS

| | | |
|---|---|---|
| TW | 321690 B | 12/1997 |
| WO | WO-2013/163350 A1 | 10/2013 |

OTHER PUBLICATIONS

International Search Report and Written Opinion on PCT Appln. PCT/US2022/020647 dated Jul. 20, 2022.

*Primary Examiner* — Arman B Fallahkhair
(74) *Attorney, Agent, or Firm* — Foley & Lardner LLP (57) ABSTRACT

The systems and methods of the present disclosure provide connectable tiles that can form a self-contained illuminated sign of potentially unlimited size. The self-contained illuminated sign can include one or more tiles. A tile can include a diffusion film having a surface to be illuminated. The tile can include a light guide plate coupled to the diffusion film. The light guide can be configured to evenly distribute light through the diffusion film. The tile can include a solar panel coupled to the light guide. The solar panel can capture light that passes through the diffusion film and the light guide. The tile can include a light source positioned adjacent to the light guide that receives stored electrical power from a battery electrically coupled to the solar panel. The tile can include a connector configured to attach the tile to a second tile.

17 Claims, 3 Drawing Sheets

(56) References Cited

U.S. PATENT DOCUMENTS

| | | | |
|---|---|---|---|
| 10,962,197 B2* | 3/2021 | Vasylyev | G02B 6/0025 |
| 2008/0037284 A1* | 2/2008 | Rudisill | F21V 23/06 |
| | | | 362/629 |
| 2011/0141397 A1 | 6/2011 | Lee | |
| 2015/0267907 A1* | 9/2015 | Thompson | F21K 9/64 |
| | | | 362/249.06 |
| 2015/0312975 A1 | 10/2015 | Tischler et al. | |
| 2016/0072430 A1* | 3/2016 | Gilbert | G09F 19/14 |
| | | | 362/606 |
| 2018/0275498 A1 | 9/2018 | Takeshita et al. | |
| 2019/0280139 A1 | 9/2019 | Donahue | |
| 2020/0409214 A1 | 12/2020 | Itakura | |

* cited by examiner

LARGE FORMAT SOLAR SIGN

BACKGROUND

The present application claims the benefit of and priority to U.S. Provisional Patent Application No. 63/162,329, filed Mar. 17, 2021, and entitled "LARGE FORMAT SOLAR SIGN," the contents of which is incorporated by reference herein in its entirety for all purposes.

BACKGROUND

Graphics can be illuminated by lighting sources. However, it can be challenging to properly illuminate graphics uniformly.

SUMMARY

Large signs are popular and ubiquitous. Such signs exist on billboards, sides of buildings and vehicles, including tractor trailers, buses, and trains. Most signs have a printed surface, often rendered by inkjet printers, including large-format printers that print a latex-based ink. Conventional printed signs are opaque, and cannot be seen at night. A small percentage of exterior signs are composed of LED Panels that present illuminated static images or even video. Other illuminated signs are composed of backlit panels that are powered by a connection to an electricity grid.

The systems and methods described herein present forms of printed large-format illuminated outdoor signage. This signage can be solar powered and include interconnected tile modules. Each tile module can itself be solar powered, and include a printable exterior surface that is uniformly lit, thus capable of illuminating a transparent or semi-transparent inks or a transparent film image. Each tile module can be self-contained and possess the components required to produce an illuminated sign. Each sign, or tile, can include a number of layers coupled to one another that form a panel. The panel can be self-contained, and include all of the components (e.g., solar panel, battery, electronics, light sources, light guide, and others) described herein to create an illuminated sign.

One such layer is a top layer. The top layer of each tile module can be a highly-transparent print-ready diffusion film that creates the illusion of being white due to a light-turning imprinted surface. Below the layer of diffusion film sits a light guide plate that emits uniform lighting due to a surface composed of precisely placed light-extracting lenses and edge-injected illumination. These two substantially transparent layers are backed by a solar cell and an electronics module that contains a battery, operational intelligence (e.g., processors, memory, etc.) and connectors having the ability to connect to the electronics module of any other tile module to create an interconnected tile module. The back of each module is a metal or plastic cover that facilitates the mechanical interconnection of each tile module.

Given the modular design, the large format solar sign presented herein can be of unlimited size. Being so, this new sign format is compatible with wide format inkjet printers that are equipped with a flatbed to directly print on the surface of each tile module, or printing an overlay film that can be applied to the surface of a sign composed of blank (unprinted) tile modules. These blank tile modules can be connected to produce a massive backlit surface that can readily illuminate traditional printed films optimized for presentation by a backlight. In summary, the systems and methods described herein provide, among other features, a large-format illuminable sign that is solar-powered, print-ready, and can include two or more connectable tile modules that feature a uniformly lit exterior surface.

At least one aspect of the present disclosure is directed to a tile for a connectable illuminated sign. The tile can include a diffusion film having a first surface to be illuminated and a second surface opposite the first surface. The tile can include a light guide plate coupled to the second surface of the diffusion film. The light guide can be configured to evenly distribute light through the diffusion film. The tile can include a solar panel coupled to a second surface of the light guide. The solar panel can be configured to capture light that passes through the diffusion film and the light guide. The tile can include a light source positioned adjacent to the light guide. The light source can receive stored electrical power from a battery electrically coupled to the solar panel. The tile can include a connector configured to attach the tile to a second tile.

In some implementations, the diffusion film can be partially transparent and the first surface can be a light-turning imprinted surface. In some implementations, the light guide can include one or more light-extracting lenses positioned in a predetermined pattern to facilitate distribution of light through the diffusion film. In some implementations, the one or more light-extracting lenses can be arranged on the light guide to uniformly distribute light across the diffusion film. In some implementations, the tile can include a voltage sensor that measures voltage output from the solar panel. In some implementations, the tile can include a processor. The processor can determine an exterior lighting condition based on the voltage output measured by the voltage sensor. The processor can communicate the exterior lighting condition to a second processor of the second tile via the connector. In some implementations, the light source can be configured to inject light into the light guide. In some implementations, the injection of the light by the light source can cause the light guide to distribute the light uniformly through the diffusion film.

In some implementations, the light source can have a thickness that is less than the thickness of the light guide. In some implementations, the tile can include an optically clear adhesive configured to fill a seam created between the tile and the second tile when the tile is coupled to the second tile via the connector. In some implementations, the optically clear adhesive has an index of refraction that matches an index of refraction of the light guide. In some implementations, the light source comprises a light-emitting diode. In some implementations, the connector can transfer electrical energy between the battery and a second battery of the second tile when the tile is coupled to the second tile via the connector. In some implementations, the first surface of the diffusion film can be coupled to an overlay film comprising a printed image. In some implementations, the first surface of the diffusion film comprises a printed image made from one or more of a black ink, a white ink, a latex ink, or a semi-transparent ink.

At least one other aspect of the present disclosure is related to a system of interconnected tiles. The interconnected tiles can form a sign of potentially unlimited size, depending on the number of tiles used. The system can include a first tile comprising a first diffusion layer, a first light guide, a first solar panel, a first light source, and a first connector. The system can include a second tile comprising a second diffusion layer, a second light guide, a second solar panel, a second light source, and a second connector. The first connector of the first tile can be coupled to the second connector of the second tile such that the first diffusion film is adjacent to the second diffusion film, and light emitted from the first light source and the second light source illuminate the second diffusion film.

In some implementations, the first diffusion layer can be coupled to the first light guide, and the first light guide can be coupled to the first solar panel. In some implementations, the second diffusion layer can be coupled to the second light guide, and the second light guide can be coupled to the second solar panel. In some implementations, the first connector can be positioned on an edge of the first tile and the second connector is positioned on an edge of the second tile. In some implementations, the first diffusion film and the second diffusion film are each partially transparent and each comprise a light-turning imprinted surface.

In some implementations, the first tile further comprises a voltage sensor that measures voltage output from the first solar panel and a first processor. In some implementations, the first processor can determine an exterior lighting condition of the first tile based on the voltage output measured by the voltage sensor. In some implementations, the first processor can communicate the exterior lighting condition of the first tile to a second processor of the second tile via the connector coupling the first tile to the second tile. In some implementations, the first light guide and the second light guide can each have an identical index of refraction. In some implementations, the connector can optically couple the first light guide to the second light guide such that light emitted by the first light source is transmitted through the first light guide and into the second light guide via the connector. In some implementations, the connector can transfer electrical energy between the first battery and the second battery.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. The foregoing and other objects, aspects, features, and advantages of the disclosure will become more apparent and better understood by referring to the following description taken in conjunction with the accompanying drawings, in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
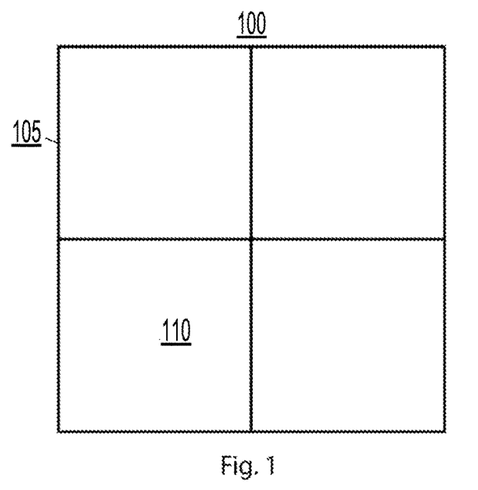
FIG. 1 illustrates a front view of an example solar sign including four tile modules, in accordance with one or more implementations.

Referring now to FIG. 1, illustrated is a front view 100 of an example solar sign 105 including four tile modules 110 (with only one tile module labeled, for clarity), in accordance with one or more implementations. As depicted in the view 100, the example solar sign 105 can be made up four tile modules 110 (sometimes referred to herein as the tiles 110), which can each be similar to and include any of the structure or functionality of the tile 110 described herein below in connection with FIG. 5. Each of the four tile modules can connect with one another, for example, using one or more connectors present on an edge of each the tiles 110. When connected, the tiles can each exchange light, power, and illumination information via the connector. As described in further detail herein below, each tile can include a diffusion film, which can appear white but still allow an amount of light (e.g., 40%, 50%, etc.) to pass through the diffusion film to the internal layers of the tile. It should be understood that, while only four tiles are shown forming the solar sign 105, that any number of tiles can be used to make a solar sign. Thus, the maximum size of the solar sign 105 can be effectively unlimited, as the modular design does not impose a limit on the number of tiles that can be used to create the solar sign 105. Further, although the solar sign 105 is shown as substantially square (or rectangular, etc.) it should be understood that the tiles 110 can be arranged in any pattern, to create any shape that possible based on the constraints of the individual tiles (e.g., square shape, number of connectors, etc.). Likewise, although the tiles 110 are shown be substantially square or rectangular here, that any shape for a tile is possible as long as the internal structure (e.g., the layers described herein in connection with FIGS. 5 and 6, etc.) are maintained. Similarly, ant tile 110 may connect to any number of other tiles 110 as long as the tile has a respective number of interfaces or connectors to couple to other tiles.

As described in greater detail herein below, the tiles 110 of the solar sign 105 can each include a solar panel, a light guide, a battery, and a light source. The light source can inject light into each light guide, which can include one or more light extracting features, such as lenses. The lenses can extract a portion of the light emitted from the light source and project the portion of the light into the diffusion film. The lenses can be precisely positioned (e.g., using light simulation software, etc.) such that the light extracted by the lenses can uniformly illuminate the entire diffusion film of a particular tile. Said another way, each tile can include a light guide that can illuminate its diffusion film. In some implementations, a portion of the light emitted by the light source that is not extracted by the light extraction feature can be reflected within the light guide towards the opposite end of the light guide, which can include a connector.

The connector can optically couple a tile 110 to another tile 110 in the solar sign 105. The light can pass through the connector and into the light guide of the other tile 110. The light can then be extracted by one or more of the light extraction features in the light guide of the other tile. Thus, when multiple tiles 110 are connected together to form the solar sign 105, light emitted by one tile 110 can be reflected within the sign 105, pass to another tile 110, and illuminate a second tile. In some implementations, the light extraction features on each of the tiles can be arranged such that the light from the tiles 110, when the tiles 110 are connected to one another, evenly illuminate the entire solar sign 105. The precise locations of each light extraction feature for each tile 110 in a particular solar sign 105 can be determined using light simulation software. The solar signs 105 described herein can be used, for example, in a printing environment. For example, the surface of each of the tiles 110 (e.g., the diffusion film surface, etc.) can be a printable medium that can pass through a printer. An example solar sign 105 having a design printed thereon is shown in FIG. 2.

Figure 2:
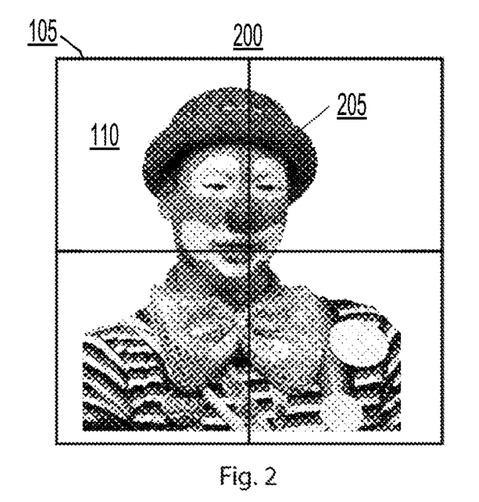
FIG. 2 illustrates a front view of an example solar sign including four tile modules that each have a printed surface, in accordance with one or more implementations.

Referring now to FIG. 2, illustrated a front view 200 of an example solar sign 105 that includes four tiles 110 that each has a printed image 205, in accordance with one or more implementations. The printed images 205 on each of the tiles 110 can be combined to form a single composite image, as shown in the view 200. As shown, each of the tiles 110 can have its own printed design that, when combined, form a complete image. Although the view 200 shows the solar sign 105 clearly showing the separation of each of the tiles 110, it should be understood that the tiles 110 can be separated by an amount such that the tiles 110 appear seamless from an average viewing distance. The average viewing distance can be, for example, two feet away from the solar sign, five feet away from the solar sign, or ten feet away from the solar sign, among others. The solar sign 105 can be compatible with wide format inkjet printers that are equipped with a flatbed to directly print on the surface of each tile 110, or printing an overlay film that can be applied to the surface of a sign composed of blank (unprinted) tiles 110. An example depiction of such an overlay is described herein below in connection with FIG. 3. The ink used to print upon the diffusion film of each of the tiles can include, for example, a latex ink, a black ink, a white ink, or any other type of ink compatible with a diffusion film.

Figure 3:
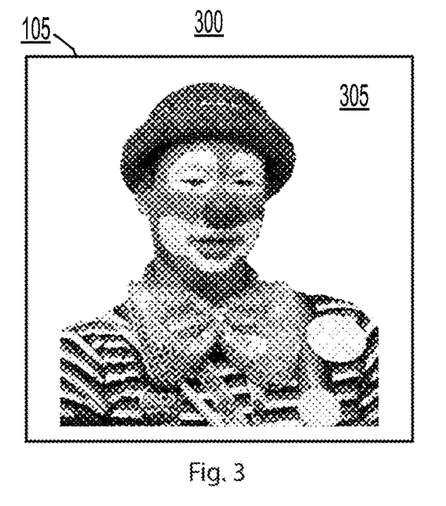
FIG. 3 illustrates a front view of an example solar sign including four tile modules that backlight a printed overlay film, in accordance with one or more implementations.

Referring briefly now to FIG. 3, illustrated is a front view 300 of an example solar sign 105 including four tiles 110 (not pictured) that backlight a printed overlay film 305, in accordance with one or more implementations. As mentioned above, in some implementations, a solar sign 105 similar to that depicted in FIG. 1 can be used to illuminate a graphical overlay instead of having a graphical design printed directly on the tiles 110. The printed overlay film 305 can be coupled to the one or more tiles 110, for example, using one or more overlay connectors. In some implementations, the overlay film can be coupled to the one or more tiles 110 using an adhesive, tape, or other type of attachment device. For example, one such attachment device can be a bracket that secures the overlay film to the surface of each of the tiles 110. In some implementations, the bracket can be coupled to the edges of the tiles 110 that form the edges of the solar sign 105. The bracket can then couple the overlay film 305 to the solar sign 105 around the edges of the overlay film 305. An overlay film 305 can be advantageous in a scenario where the graphical design displayed on the solar sign 105 will be changed frequently. In some implementations, the overlay 305 can be used in conjunction with one or more tiles 110 having a design printed directly onto the diffusion film. For example, a solar sign 105 may include any number of printed tiles 110 (e.g., tiles having a design printed thereon, etc.) and a number of blank tiles. An overlay 305 can be placed over the blank tiles, which can uniformly illuminate the overlay 305 in the same manner as the printed tiles 110 illuminating their printed design. For example, an example hybrid (e.g., including both blank and printed tiles, etc.) solar sign 105 can be created that include half (e.g., the left half, etc.) of the tiles 110 as blank, and used in conjunction with an overlay such as the overlay 305, and the other half of the tiles 110 having a printed design.

Figure 4:
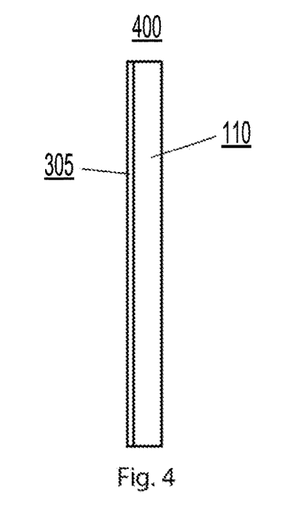
FIG. 4 illustrates a side view of an example solar sign with a printed overlay film, in accordance with one or more implementations.

FIG. 4 illustrates a side view 400 of an example solar sign 105 with a printed overlay film, in accordance with one or more implementations. The solar sign 105 with the printed overlay film can be similar to the solar sign 105 depicted in FIG. 3. As shown in FIG. 4, the overlay 305 can be positioned on the surface of the tiles 110 that make up the solar sign. The overlay 305 can be a semi-transparent film with a graphical design printed thereon. In some implementations, the overlay 305 can have semi-transparent inks printed on the surface of the overlay 305. The overlay 305 can be coupled to one or more of the tiles 110, as described herein above. The view 400 shows that the tiles 110 each have a thickness that is great enough to accommodate the internal components of the tiles 110. As described in greater detail herein below, the tiles 110 can include a diffusion film, a light guide plate, a solar panel, and electronic components such as a battery that allow the sign to both store energy and provide uniform illumination. The tiles 110 that form the edges of the solar sign 105 can include one or more sealing features at the outer edges. In addition, the connection points between each of the tiles 110 can be sealed such that the solar sign 105, and the tiles 110 that make up the solar sign 105, are waterproof. Thus, the solar sign 105 can be positioned in an outdoor environment for long periods of time, and operate without needing to be opened. Each of the tiles 110 can include a housing that encloses the layers described in greater detail below, such that the tiles 110 have an overall uniform appearance and prevent any weather elements (e.g., rain, snow, debris, etc.) from damaging the internal components of the tiles 110 or the sign 105. The internal components of the tiles 110 and the sign 105 are described in further detail below in connection with FIGS. 5 and 6.

Figure 5:
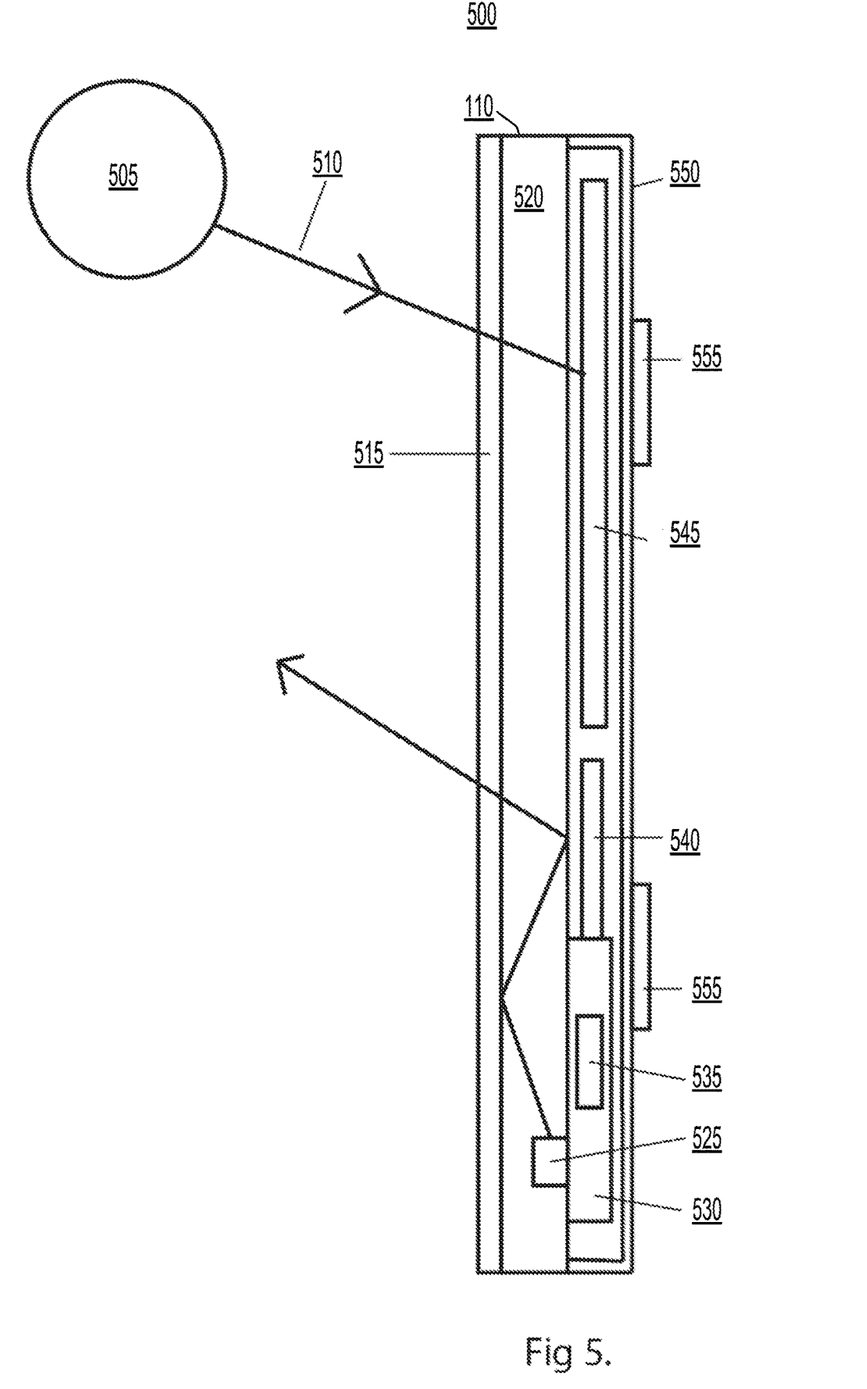
FIG. 5 illustrates a cross-sectional view of an example tile module, in accordance with one or more implementations.

FIG. 5 illustrates a cross-sectional view 500 of an example tile 110, in accordance with one or more implementations. The tile 110 can include at least one diffusion film 515, at least one light guide plate 520, at least one illumination source 525, at least one electronics module 530, at least one voltage sensor 535, at least one battery 540, at least one solar cell 545, at least one housing 550, and support hardware 555. The tile 110 can further include one or more connectors (not pictured) that a tile can use to couple to one or more other tiles 110. For example, a connector can be present on an edge of the tile, and can include electrical connections such that electrically couple the electronics module 530 of one tile to the electronics module 530 of another tile. In addition, connected tiles 110 can sit flush with one another, such that an edge of the light guide plate 520 of one tile 110 is aligned along the edge of the light guide plate 520 of another tile 110, such that the light guide plates 520 can exchange light with one another. For example, each of the light guide plates 520 can have an identical (or nearly identical, plus or minus 10%, etc.) index of refraction. Further details of a tile 110 connected to another tile 110 are detailed herein below in connection with FIG. 6.

The diffusion film 515 can be a sheet of partially transparent film that has a first surface exposed to the external environment and a second surface that is coupled to the light guide plate 520. The diffusion film 515 can include a light-turning imprinted surface (e.g., the surface facing the external environment, etc.). The diffusion film 515 can be a diffusion plate, and can be rigid or flexible and be sized to cover the front area of the tile 110. The diffusion film 515 can be a partially transparent that appears white, or another solid color, while still allowing an amount of light to pass through the diffusion film and into the light guide plate 520. For example, as shown in the view 500, the external light source 505 (e.g., the sun, etc.) emits the light 510, which passes through both the diffusion film 515 and the light guide plate 520, striking the solar cell 545 where it is absorbed. The diffusion film 515 can be a printable film, such that the diffusion film 515 can be made from a material to which printer ink can be directly applied. Thus, a fully constructed tile 110 or solar sign 105 can be passed through a wide format printer, such as a wide format inkjet printer, which can print a graphical design directly onto the diffusion film 515 of the tile 110. The tile 110 can be placed on or coupled to a template that guides the tile 110 through the inkjet printer to facilitate the printing process. The diffusion film 515 can be printed using a latex ink, a black ink, a white ink, or any other semi-transparent ink. The diffusion film 515 can be uniformly illuminated by the light extracted by the light extraction features of light guide plate 520, such that the tile 110 and any graphical designs printed thereon can be illuminated in low-light environments (e.g., at night time, etc.). In some implementations, and as described herein above, the diffusion film 515 can be coupled to an overlay film (e.g., the overlay film 305, etc.) such that the illuminated diffusion film 515 provides uniform illumination through the overlay film 305.

The light guide plate 520 can be a transparent plate of material that can both receive and guide light from one or more light sources, such as the illumination source 525 or the external light source 505. As described herein, the surface of the light guide plate 520 (e.g., the surface coupled to the diffusion film 515, etc.) can include one or more light extraction features, such as lenses or lenslets. These features can extract a portion of the light injected into the light guide plate 520, such as the light emitted by the illumination source 525. The light guide plate 520 can guide another portion of the light injected into the light guide towards an opposite edge of the light guide plate 520. The light extraction features can be precisely placed across the surface of the light guide plate 520 in a predetermined pattern, such that light is uniformly extracted, and thus emitted, across the entire surface of the light guide plate 520. Thus, the light guide plate 520 can uniformly illuminate the diffusion film 515 (and any graphical designed printed thereon or any overlays coupled thereto). The light guide plate 520 can be optically coupled to the illumination source 525. In some implementations (as pictured in FIGS. 5 and 6, etc.) the illumination source 525 can be positioned within a cavity formed in the light guide plate 520. The illumination source 525 can emit light through the cavity and into the body of the light guide plate 520, thereby injecting light into the light guide plate 520. In some implementations, the light guide plate 520 does not include a cavity, and instead is a uniform rectangular plate that can receive light emitted from the illumination source 520 from an edge of the light guide plate 520. In such implementations, the illumination source 525 can be positioned external to the light guide plate 520 and inject light into the light guide plate via the edge.

Figure 6:
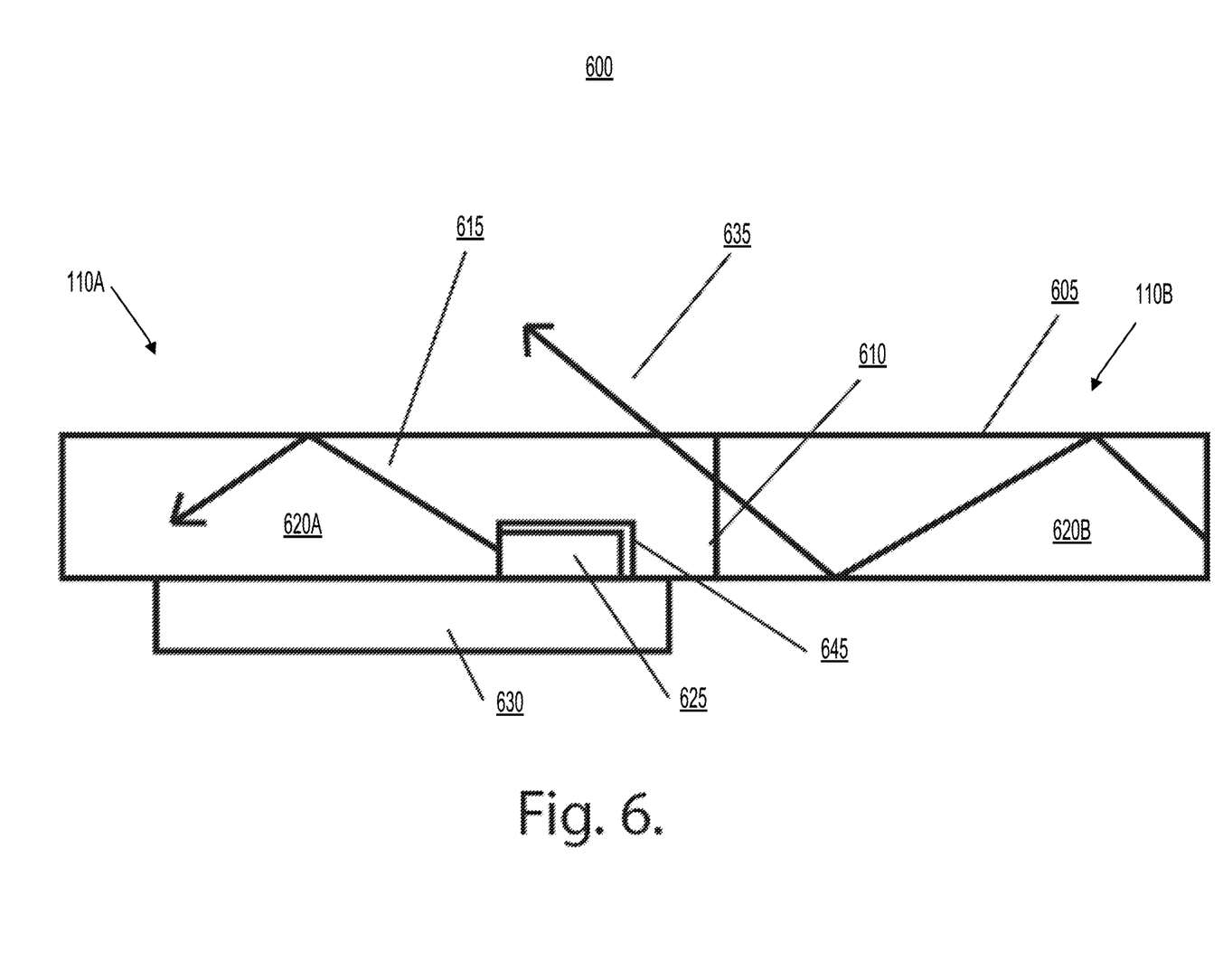
FIG. 6 illustrates is a cross-sectional view of an example connection of two example tile modules, in accordance with one or more implementations.

The illumination source 525 can be any sort of light source that can emit light in response to receiving electric energy. The illumination source 525 can be electrically coupled to and receive electric power from the electronics module 530. The illumination source 525 can emit light with an intensity that is proportional to the amount of electric power received from the electronics module 530. The electronics module 530 can control the amount of electric power provided to the illumination source 525, and thus the amount of light emitted by the illumination source 525. The illumination source 525 can have a height (e.g., the dimension of the illumination source 525 measuring from the left side of FIG. 5 to the right side of FIG. 5, etc.) that is less than the total width (e.g., the dimension of the light guide plate 520 from the left side of FIG. 5 to the right side of FIG. 5, etc.) of the light guide plate 520. Thus, if light is injected from another light guide plate 520 from another tile 110 (e.g., as shown in FIG. 6, etc.) the light received from the other tile can be guided over the illumination source 525 to uniformly illuminate areas of the diffusion film 515 beyond the illumination source 525. Said another way, the height of the illumination source 525 being less than the width of the light guide plate 520 prevents the illumination source 525 from obstructing light injected into the light guide plate 520 from other tiles 110 to which the tile 110 is connected (e.g., via one or more connectors, etc.). Thus, the edges that contact a light emitting surface of the illumination source 525 can be equal to a portion of the thickness to the light guide plate 520, thereby enabling light emission from the area of the light guide plate 520 located above the illumination source 525. The illumination source 525 can be, for example, one or more light-emitting diodes (LEDs), or any other type of illumination source 525. The illumination source 525 can be a bright source of light that uses a low amount of power.

The electronics module 530 can include at least one processor and a memory (e.g., a processing circuit, etc.). The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language.

The processor of the electronics module can receive signals (e.g., via an interconnect or other communications bus, etc.) from the voltage sensor 535 that correspond to the amount of light being received by the solar cell 545. Based on the mount of light received from the solar cell 545, the processor can provide signals to one or more switches (e.g., transistors, integrated circuits, etc.) that cause the battery 540 to provide electric power to the illumination source 525. For example, if the processor of the electronics module 530 detects that the amount of voltage produced by the solar cell 545 has fallen below a predetermined threshold, the electronics module can determine that the tile 110 is not properly illuminated. Based on the signals from the voltage sensor 535, the electronics module can determine whether the amount of light striking the solar cell 545 represents a temporary blockage (e.g., an external light source is obscured temporarily, etc.), of the amount of light striking the solar cell 545 represents that the tile 110 is now in a dark environment (e.g., it is now night time, or the tile 110 has been moved to a dark room, etc.). The processor can compensate for the low light levels by transitioning form an unilluminated (e.g., the illumination source 525 is not receiving power, etc.) state to an illuminated (e.g., the illumination source 525 is receiving power, etc.) state. The electronics module 530 can provide an amount of power that is proportional to the amount of light required to illuminate the diffusion film 515. In some implementations, the electronics module 530 can store information about the amount and the color of one or more overlays 305 or printed images 205 present on the diffusion film. For darker images with more ink, the electronics module 530 can provide more electric power to the illumination source 525, thus providing more light to illuminate the darker graphic. Likewise, if a graphic on the diffusion film 515 or an overlay present on the tile 110 is absent, or has light or small amounts of ink, the electronics module 530 can provide slightly less electric power to the illumination source 525, thus providing uniform illumination across all tiles in a solar sign 105.

The voltage sensor 535 can be electrically coupled to the solar cell 545, and can monitor the amount of voltage produced by the solar cell 545 in response to absorbing light. The voltage sensor 535 can provide signals to the electronics module 530 that indicate an amount of voltage produced by the solar cell 545. These signals can be proportional to the amount of light being absorbed by the solar cell 545, and can thus indicate the overall external illumination of the tile 110. The voltage sensor 535 can further be coupled to the battery 540, which can be any sort of battery capable of powering the electronics module 530 or the illumination sources 525. The battery 540 can be, for example, a lithium polymer battery, a lithium ion battery, a nickel-cadmium battery, or any other type of battery that can have a thin form factor. The battery can be electrically coupled to and provide electric power to the electronics module 530. In some implementations, the battery 540 can be coupled to and receive electric power from the solar cell 545. The solar cell 545 can thus charge the battery 540, which stores electrical energy to illuminate the tile 110 (as described herein) in low light environments. In some implementations, the electronics module 530 can also receive electric power directly from the solar cell 545, and thus be powered even in circumstances where the battery 540 may be empty or non-functional.

The solar cell 545 can be coupled to the light guide plate 520, and can absorb light that passes through the diffusion film 515 and the light guide plate 520. The solar cell 545 can provide electric power to the other components of the tile 110 described herein. As shown in the view 500, the light 510 emitted from the external light source 505 (e.g., the sun, etc.) can pass through the diffusion film 515 and the light guide plate 520, and contact the surface of the solar cell 545. Photons in the light 510 can be absorbed by the solar cell 545 and converted into an electron flow that is stored in the battery 540. The battery 540 can store a charge over the course of a day (e.g., via the solar cell 545 absorbing energy from the external light source 505, etc.). Then, in circumstances of low light (e.g., each evening if the tile 110 is positioned outside, etc.), the solar cell 545 can generate a decreased electron flow (e.g., a decreased voltage from what was produced during periods of high external light 510, etc.), which is sensed by voltage sensor 535. The electronics module 530 can then active the illumination source 525 by providing a signal to power circuitry in the electronics module 530 that causes the battery to provide electric power to the illumination source 525, as described herein. The illumination source 525 can emit and injects light into the light guide plate 520. The injected light can then be extracted by the light extracting features, (e.g., the lenses or lenslets, etc.) of the light guide plate 520, thereby creating a uniformly lit surface across the surface of the diffusion film 515. The uniformly lit diffusion film 515 can thus illuminate any printed inks or an overlay film to produce illuminated signage. Then, when an amount of external light is detected at a later time by the solar cell 545 (e.g., the solar cell begins absorbing more light 510 and generating a higher voltage, etc.) the electronics module 530 can determine that illumination is no longer needed for the tile 110, and reduce or remove electric power from the illumination source 525. The solar cell 545 can be any sort of photovoltaic cell. The solar cell 545 can be constructed from semiconducting materials, such as doped silicon. The solar cell 545 can be any sort of solar panel or solar film.

Each of the components of the tile 110 shown in FIG. 5 can be manufactured to fit within a housing 550. The housing 550 can be a relatively thin housing that contains each of the components of the tile 110. The housing 550 can be waterproof, and can prevent unwanted materials (e.g., water, dust, debris, etc.) from entering the sign and causing electrical issues or blocking light paths. The housing 550 can be constructed from a polymer material, a metal material, or a composite material. As shown in the view 500, each of the components of the tile 110 (e.g., the electronics module 530, the voltage sensor 535, the battery 540, the solar cell 545, the light guide plate 520, and the diffusion film 515, etc.) can be placed on one or more layers in the housing. The components can be coupled to one another, for example, by one or more mechanical features (e.g., each of the components can be manufactured to fit together tightly within the housing 550, etc.), such as connectors, fasteners, or other mechanical coupling features. In some implementations, one or more of the components of the tile 110 can be coupled to one another via an adhesive. In some implementations, the adhesive can be an optically transparent adhesive. The outer portion of the housing 550 can be coupled to the support hardware 555.

The support hardware 555 can include one or more fasteners, connectors, or mechanical coupling features that can be used to fasten the tile 110 to another fixture. For example, the fixture can be a building, an automobile (e.g., a bus, etc.), a sign post, a billboard, or any other location where a sign can be located. In some implementations, the support hardware 555 can be chosen to support the desired size of the overall solar sign 105 made up of the tiles 110. For example, larger signs made up of many tiles 110 can be heavy, and require robust support hardware 555. In contrast, a solar sign 105 made of few tiles 110 may require less robust hardware to support the solar sign 105.

As described herein above, the tiles 110 can be connected to one another via one or more connectors (not pictured). The connectors can communicatively couple the electronics modules 530 of each tile 110 to one another, such that the electronics modules 530 can exchange information. The connectors can be positioned at the edge of the tiles 110, and can include one or more communications bus interfaces that are communicatively coupled with the processors of the electronics modules 530. Thus, when connected, the communications bus interfaces of each tile 110 can be in contact and become communicatively coupled and allow each of the electronics modules 530 to exchange information about illumination levels, brightness, voltage levels, and other information. The connector can include one or more power connections that allow the tiles 110 to exchange electrical power from the solar cells 545 or the batteries 540 present in each of the tiles 110. The amount of power shared can be controlled by the electronics modules 530 in each tile 110. The connectors can be configured such that when An example depiction of two tiles 110 coupled to one another is in FIG. 6.

Referring now to FIG. 6, illustrated is a cross-sectional view 600 of an example connection of two example tiles 110, in accordance with one or more implementations. For clarity, certain features shown in FIG. 5 have been omitted from FIG. 6. It should be understood that each of the tiles 110A and 110B can include all of the features of the tile 110 described herein above in connection with FIGS. 1-5. The view 600 depicts a tile 110A coupled to a tile 110B via one or more connectors (not pictured). The tile 110A can include a light guide plate 620A, which can be similar to and have the same structure and functionality as the light guide plate 520 described herein above in connection with FIG. 5. Likewise, the tile 110B tile 110A can include a light guide plate 620B, which can be similar to and have the same structure and functionality as the light guide plate 520 described herein above in connection with FIG. 5. As shown, when the tiles 110A and 110B are coupled to one another, the light guide plates 620A and 620B can be flush with one another (e.g., substantially aligned along an edge of the light guide plates 620A and 620B, etc.). Each of the light guide plates 620A and 620B can have substantially similar (e.g. identical or nearly identical) indices of refraction, such that light passing through one light guide plate does not substantially change direction when it passes to another light guide plate.

Thus, the light guide plates 620A and 620B can provide uniform illumination of an entire solar sign 105 surface as described herein above, by way of optically seamless connection of each tile 110. This can be achieved, as shown in view 600, by connecting the edges of the light guide plates 620A and 620B within each tile 110 (e.g., via a connector, etc.). As an artifact of edge-injected illumination, each of the light guide plates 620A or 620B may emit light. The location where the light guide plates 620A and 620B can be referred to herein as a "seam 610". When the tile 110A is connected to the tile 110B, the light stream 635 (e.g., emitted from an illumination source (not pictured) in the tile 110B, etc.) can combine with the light produced by the illumination source 625 (e.g., which can be similar and include any of the functionality of the illumination source 525, etc.). The combined light can increase the overall intensity of light within each connected tile 110 in a solar sign 105. This effect can be compounded when many tiles 110 are connected to one another to form a single solar sign 105.

To avoid any non-illuminated (e.g., under illuminated, non-uniform illumination, etc.) areas on the solar sign 105 surface, the area of the light guide plate 620A above the illumination source 625 can include light extracting features (e.g., lenses, lenslets, etc.) that emit light, thus effectively hiding the light source. In some implementations, a permanent, or temporary (but repositionable), optically clear (e.g., transparent, have a similar index of refraction, etc.) adhesive can be present in the seam 610 formed between the light guide plate 620A and 620B. The optically clear adhesive can increase overall light transmission by the connected light guide plates 620A and 620B by mitigating light leakage out of the seam 610.

The optically clear adhesive, with a matching index of refraction, can help address issues with light leaking out of the seam 610 (e.g., bright spots at the boundary between tiles). Additionally or alternatively, a tape material can be used to seal the seam 610 between the light guide plates 620A and 620B. The tape can include a printed black dot pattern, which can dim any light leaking through the seam 610A by acting as a partial shade. The printed tape can include printed, black dots that are printed in a predetermined pattern or density (e.g., uniformly distributed, another predetermined pattern, etc.). The tape can be positioned under the diffusion film (not pictured here, e.g., the diffusion film 515 of FIG. 5, etc.) of each tile. The printed tape can include a printed area that has small 60-150 um diameter black (opaque) pixels, which may be uniformly distributed, to avoid dark spots. In some implementations, the black dots used to reduce light leakage through the seam 610 may be printed directly onto the backside of artwork or the diffusion film.

Further, as described herein above, the illumination source 625 can be positioned within a cavity 645 formed within the light guide plate 620A, and have a height that is less than the overall thickness of the light guide plate 620A, allowing light to pass over and be emitted above the illumination source 625. The electronics module 630 can be in communication with an electronics module (not pictured) of the other tile 110B, such that the tiles exchange information about overall illumination, the amount of light being absorbed by the solar cells (not pictured), among other data. The diffusion films (not pictured) of the tiles 110A and 110B can be similarly aligned, and uniformly illuminated by the light emitted by the light sources in the tiles 110A and 110B. Thus, the hardware and software (e.g. processor executing instructions, etc.) of the electronics module 630 can present uniform lighting across the entire surface of the solar sign 105, by sharing battery power and illumination information with other interconnected tiles, such as the tiles 110A and 110B. The mechanical interconnection between the tiles 110A and 110B (e.g., each tile in a solar sign 105, etc.) can be supported by the housing (not pictured, but similar to the housing 550 detailed herein above in connection with FIG. 5, etc.), which can include one or more connectors long the edges of the tiles 110A and 110B, as described herein.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including", "comprising", "having", "containing", "involving", "characterized by", "characterized in that", and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

As used herein, the terms "about" and "substantially" will be understood by persons of ordinary skill in the art and will vary to some extent depending upon the context in which they are used. If there are uses of the term which are not clear to persons of ordinary skill in the art given the context in which it is used, "about" will mean up to plus or minus 10% of the particular term.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising: a first tile comprising a first diffusion film, a first light guide, a first solar panel, a first light source, the first diffusion film comprising a first surface to be illuminated and a second surface opposite the first surface, the second surface adjacent to the first light guide, the first diffusion film receiving light at the second surface and emitting the light via the first surface; and a second tile comprising a second diffusion film, a second light guide, a second solar panel, a second light source, the second tile adjacent to the first tile, wherein a first edge of the first light guide of the first tile is optically coupled to a second edge of the second light guide of the second tile such that the first diffusion film is adjacent to the second diffusion film, and light emitted from the first light source and the second light source illuminate the second diffusion film; wherein the first light guide is adjacent to the second surface of the layer of the first diffusion film, the first light guide configured to distribute light through the layer of first diffusion film, the layer of first diffusion film configured to diffuse the light emitted from the light guide to illuminate a graphic on the first surface, the layer of the first diffusion film receiving the light at the second surface and emitting the light via the first surface; wherein the first edge of the first light guide is configured to optically interface with and receive additional light from the second edge of the second light guide of the second tile, the additional light emitted via the second light source of the second tile.

2. The tile of claim 1, further comprising an optically clear adhesive configured to fill a seam created between the tile and the second adjacent tile.

3. The tile of claim 2, wherein the optically clear adhesive has an index of refraction that matches an index of refraction of the light guide.

4. The tile of claim 1, wherein the light guide comprises one or more light-extracting features to facilitate distribution of light through the layer of diffusion film.

5. The tile of claim 1, further comprising:
a voltage sensor that measures voltage output from the solar panel; and
a processor configured to:
determine an exterior lighting condition based on the voltage output measured by the voltage sensor; and
communicate the exterior lighting condition to a second processor of the second adjacent tile.

6. The tile of claim 1, wherein the light source is configured to inject light into the light guide, causing the light guide to distribute the light uniformly through the layer of diffusion film.

7. The tile of claim 1, wherein the light source has a thickness that is less than the thickness of the light guide.

8. The tile of claim 1, wherein the light source comprises a light-emitting diode.

9. The tile of claim 1, wherein the battery is configured to distribute power a second battery of the second adjacent tile.

10. The tile of claim 1, wherein the first surface of the layer of diffusion film is coupled to an overlay film comprising a printed image.

11. The tile of claim 1, wherein the graphic comprises one or more of a black ink, a white ink, a latex ink, or a semi-transparent ink.

12. A system, comprising:
a first tile comprising a first diffusion film, a first light guide, a first solar panel, a first light source, the first diffusion film comprising a first surface to be illuminated and a second surface opposite the first surface, the second surface adjacent to the first light guide, the first diffusion film receiving light at the second surface and emitting the light via the first surface; and a second tile comprising a second diffusion film, a second light guide, a second solar panel, a second light source, the second tile adjacent to the first tile;

wherein a first edge of the first light guide of the first tile is optically coupled to a second edge of the second light guide of the second tile such that the first diffusion film is adjacent to the second diffusion film, and light emitted from the first light source and the second light source illuminate the second diffusion film.

13. The system of claim 12, wherein the first light guide is coupled to the first solar panel;

wherein the second diffusion film is coupled to the second light guide, and the second light guide is coupled to the second solar panel; and wherein the first edge of the first light guide is coupled to the second edge of the second tile.

14. The system of claim 12, wherein the first diffusion film and the second diffusion film each comprise a respective portion of the graphic.

15. The system of claim 12, wherein the first tile further comprises:
   a voltage sensor that measures voltage output from the first solar panel; and
   a first processor configured to:
      determine an exterior lighting condition of the first tile based on the voltage output measured by the voltage sensor; and
      communicate the exterior lighting condition of the first tile to a second processor of the second tile.

16. The system of claim 12, wherein the first light guide and the second light guide each have an identical index of refraction.

17. The system of claim 12, wherein a first battery of the first tile is configured to transfer electrical energy to a second battery of the second tile.

* * * * *